United States Patent [19]

Holley

[11] 4,371,058
[45] Feb. 1, 1983

[54] SPRING MOTOR

[76] Inventor: Joe W. Holley, 2938 S. Radford, Memphis, Tenn. 38114

[21] Appl. No.: 193,663

[22] Filed: Oct. 3, 1980

Related U.S. Application Data

[63] Continuation-in-part of Ser. No. 68,154, Aug. 20, 1979, abandoned.

[51] Int. Cl.³ .............................................. F03G 1/00
[52] U.S. Cl. ...................................... 185/11; 60/407; 185/14; 185/38
[58] Field of Search ........................ 185/11, 14, 44, 38

[56] References Cited

U.S. PATENT DOCUMENTS

| | | | |
|---|---|---|---|
| 1,217,493 | 2/1917 | Parsons | 185/38 |
| 1,481,279 | 1/1924 | Zippel | 185/11 |
| 1,501,677 | 7/1924 | McMahon | 185/38 |
| 4,020,923 | 5/1977 | Taylor | 185/11 |

Primary Examiner—Allan D. Herrmann
Attorney, Agent, or Firm—Walker & McKenzie

[57] ABSTRACT

A spring motor for selectively rotating a drive shaft. The spring motor includes a spiral power spring for causing an axle to rotate, and a flywheel for being rotated by the axle. The power spring-flywheel combination is capable of providing continuous power to a drive shaft even while the power spring is being rewound or recoiled.

8 Claims, 14 Drawing Figures

SPRING MOTOR

CROSS-REFERENCE TO RELATED APPLICATION

This is a continuation-in-part of my application, Ser. No. 068,154, filed Aug. 20, 1979, now abandoned, and entitled "SPRING MOTOR".

BACKGROUND OF THE INVENTION

1. Field of the Invention

This invention is related in general to motors for rotating a drive shaft and more specifically to such motors which utilize springs to rotate the drive shaft.

2. Description of the Prior Art

Various spring driven motors, engines and the like have heretofore been developed. See, for example, Hockett, U.S. Pat. No. 463,315; Haas, U.S. Pat. No. 695,430; McDaniel, U.S. Pat. No. 875,943; Rhodes, U.S. Pat. No. 1,108,474; Sims, U.S. Pat. No. 1,258,158; Burton, U.S. Pat. No. 1,384,426; Nakagawa, U.S. Pat. No. 1,814,489; Middlestetter, U.S. Pat. No. 2,493,989; and Schindel, U.S. Pat. No. 3,693,759. None of the above patents disclose or suggest the present invention.

SUMMARY OF THE PRESENT INVENTION

The present invention is directed towards providing an efficient motor for rotatably driving a drive shaft. The concept of the present invention includes, in general, a motor that utilizes a power spring-flywheel combination that is capable of providing continuous power to a drive shaft even while the power spring is being rewound or recoiled.

The spring motor of a first embodiment of the present invention comprises, in general, a casing means; first and second spring cylinder means, each spring cylinder means including a body means for being fixedly attached to the casing means, an axle means for being rotatably attached to the body means, the axle means having a first end and a second end, spiral power spring means having a first end for being attached to the axle means and having a second end for being attached to the body means, uncoiling of the power spring means causing the axle means to rotate in a first direction, rotation of the axle means in a second direction causing the power spring means to be rewound or recoiled, a first gear member attached to the first end of the axle means, and a second gear member attached to the second end of the axle member; a transfer means comprising a main shaft member for being rotatably attached to the casing means and having first and second ends, a first gear member attached to the first end of the main shaft member for operatively engaging the first gear member of the first spring cylinder means to cause the main shaft member to rotate when the power spring means of the first spring cylinder means uncoils, a second gear member attached to the second end of the main shaft member for operatively engaging the first gear member of the second spring cylinder means to cause the main shaft member to rotate when the power spring means of the second spring cylinder means uncoils, gear train means for causing the drive shaft to rotate when the main shaft member rotates, and flywheel means for being rotated by the gear train means for moderating any fluctuations in the speed of rotation of the main shaft member; and a motor means for selectively rewinding the first and second spring cylinder means.

The spring motor of a second embodiment of the present invention comprises, in general, a spring cylinder means including a body means for being fixedly attached to some anchor point, an axle means for being rotatably attached to the body means, the axle means having a first end and a second end, spiral power spring means having a first end for being attached to the axle means and having a second end for being attached to the body means, uncoiling of the power spring means causing the axle means to rotate in a first direction, rotation of the axle means in a second direction causing the power spring means to be rewound or recoiled; flywheel means coupled to the first end of the axle means for being rotated when the power spring means uncoils; hydraulic pump means for being driven by the rotation of the flywheel, an accumulator means for receiving hydraulic fluid when the pump means is driven, and hydraulic motor means for being driven by the accumulator means and for rotating a drive shaft.

DESCRIPTION OF THE PREFERRED EMBODIMENT

Figure 1:
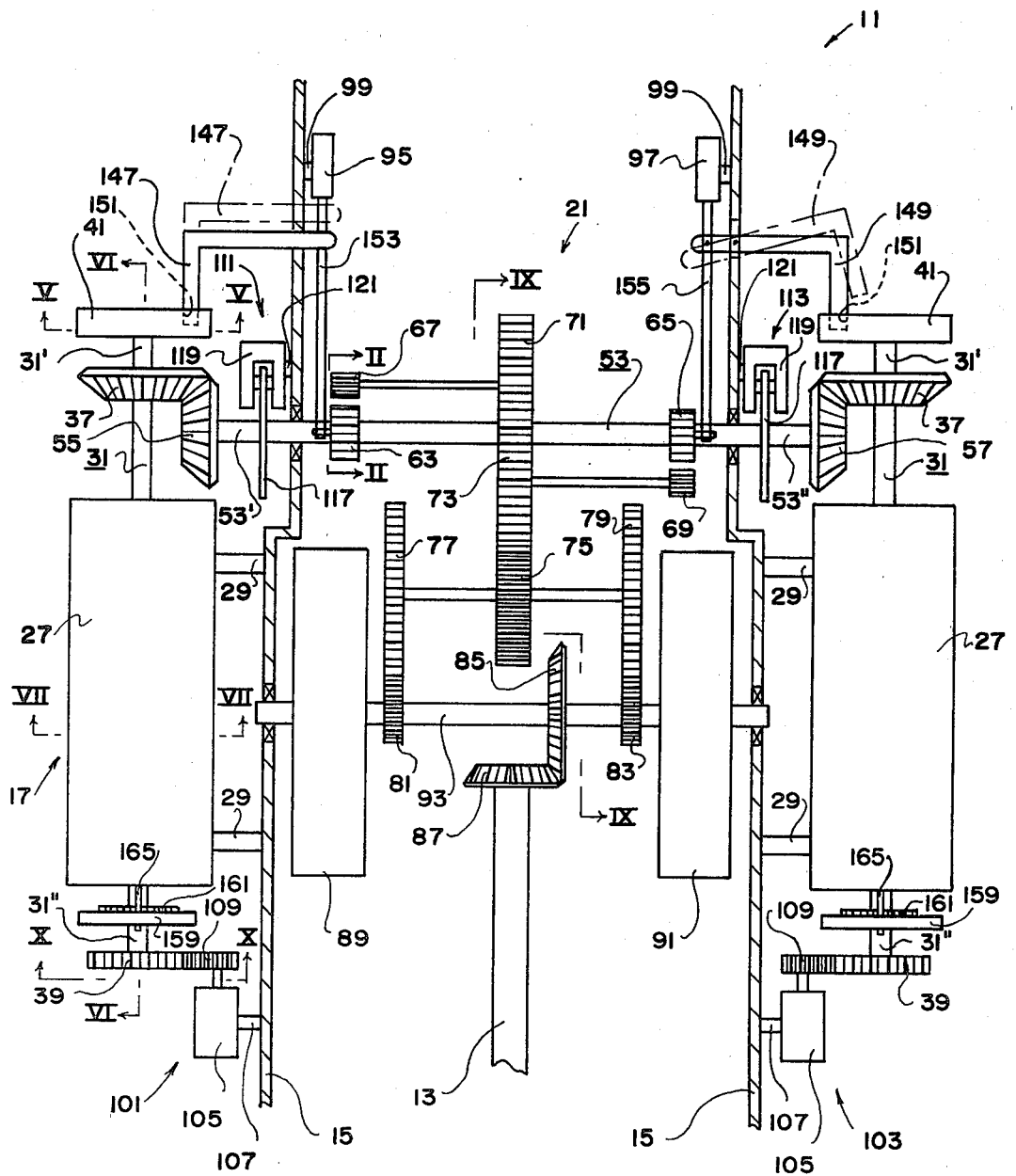
FIG. 1 is a somewhat diagrammatic top plan view of a first embodiment of the spring motor of the present invention with some parts thereof broken away for clarity.
Figure 2:
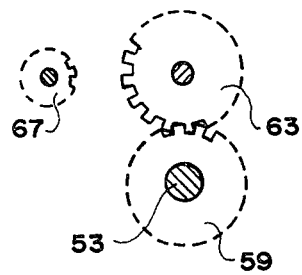
FIG. 2 is a sectional view as taken on line II—II of FIG. 1 with some parts thereof not shown.

A first embodiment of the spring motor of the present invention is shown in FIGS. 1-12 and identified by the reference numeral 11. The spring motor 11 of the present invention is for selectively rotating a drive shaft 13 which can be used in any manner apparent to those skilled in the art such as, for example, driving a generator, an automobile, or the like. Of course, the size, strength and power output required of the spring motor 11 will depend on the ultimate use thereof. In general, the spring motor 11 includes a casing means 15; first and second spring cylinder means 17, 19; transfer means 21 for transferring rotary motion from the spring cylinder means 17, 19 to the drive shaft 13, and motor means for selectively rewinding the first and second spring cylinder means 17, 19.

The first and second spring cylinder means at 17, 19 are substantially identical and the below description of the first spring cylinder means 17 should suffice for both (like parts of the first and second cylinder means 17, 19 will be referenced by like numerals in the drawings, etc.). The first spring cylinder means 17 includes a body means 27 for being fixedly attached to the casing means 15 in any manner apparent to those skilled in the art. For example, one or more mounting members 29 may extend between the casing means 15 and body means 27 and be fixedly attached to both the casing means 15 and body means 27 in any manner apparent to those skilled in the art such as by way of welding or the like (see, in general, FIG. 1). The body means 27 is substantially hollow. The spring cylinder means 17 also includes an axle means 31 for being rotatably attached to the body means 27 in any manner apparent to those skilled in the art such as by being mounted in roller bearings that are in turn mounted to the body means 27 (see, in general, FIG. 6). The axle means 31 has a first end 31' and a second end 31" extending past the body means 27. The spring cylinder means 17 includes a spiral power spring means 33 having a first end 33' for being attached to the axle means 31 and having a second end 33" for being attached to the body means 27. The first and second ends 33', 33" may be attached to the axle means 31 and body means 27 in any manner apparent to those skilled in the art. For example, the axle means 31 and body means 27 may be provided with grooves 35 for respectively receiving the first and second ends 33', 33" whereby the first and second ends 33', 33" are attached thereto (see, in general, FIG. 7). Uncoiling or unwinding of the power spring means 33 will cause the axle means 31 to rotate in a first direction (e.g., clockwise). Rotation of the axle means 31 in a second direction (e.g., counterclockwise) will cause the power spring means 33 to coil or rewind. The first spring cylinder means 17 includes a first gear member 37 attached to the first end 31' of the axle means 31 and includes a second gear member 39 attached to the second end 31" of axle means 31 and includes a second gear member 39 attached to the second end 31" of the axle means 31. A plate-like member 41 is also preferably attached to the first end 31' of the axle means 31. The first and second gear members 37, 39 and the plate-like member 41 may be attached to the axle means 31 in any manner apparent to those skilled in the art. Preferably, a ratchet means is provided between the gear members 37, 39 and plate-like member 41 and the axle means 31 for allowing free rotation between the members 37, 39, 41 and the axle means 31 in one direction while preventing the rotation therebetween in the other direction. More specifically, the first spring cylinder means 17 preferably includes a first ratchet means 43 for allowing free rotation between axle means 31 and the first gear member 37 thereof in the second direction while preventing free rotation therebetween in the first direction, a second ratchet means 45 for allowing free rotation between the axle means 31 and the second gear member 39 thereof in the first direction while preventing free rotation therebetween in the second direction, and a third ratchet means 47 for allowing free rotation between the axle means 31 and the plate-like member 41 in the second direction while preventing free rotation therebetween in the first direction (see the diagrammatic representations in FIG. 6). The ratchet means 43, 45, 47 may be of any particular construction known to those skilled in the art. For example, the third ratchet means 43 may include (see FIG. 5) a gear member 49 fixedly attached to the axle means 31 for rotation therewith and may include a keeper member 51 pivotally attached to the plate-like member 41 for coacting with the gear member 49 to thereby prevent rotation of the axle means 31 relative to the plate-like member 41 in the first direction so that when the axle means 31 is rotating in the first direction, the plate-like member 41 will also rotate in the first direction but when the axle means 31 is rotating in the second direction, the plate-like member 41 does not have to rotate therewith (also, if the plate-like member 41 is prevented from rotating in a manner hereinafter to be described, the axle means 31 will be prevented from rotating in the first direction). The first and second ratchet means 41, 45 are identical in construction to the third ratchet means 47 and the above description of the third ratchet means 47 should suffice.

The transfer means 21 includes a main shaft member 53 for being rotatably attached to the casing means 15. The main shaft member 53 may be rotatably attached to the casing means 15 in any manner apparent to those skilled in the art such as by way of roller bearings or the like. The main shaft member 53 has a first end 53' for extending on one side of the casing means 15 and a second end 53" for extending on the other side of the casing means 15. The transfer means 21 includes a first gear member 55 attached to the first end 53' of the main shaft member 53 for operatively engaging the first gear member 37 of the first spring cylinder means 17 to cause the main shaft member 53 to rotate when the power spring means 33 of the first spring cylinder means 17 uncoils. The transfer means 21 also includes a second gear member 57 fixedly attached to the second end 53" of the main shaft member 53 for operatively engaging the first gear member 37 of the second spring cylinder means 19 to cause the main shaft member 53 to rotate when the power spring mans (not shown) of the second spring cylinder means 19 uncoils. The transfer means 21 includes a gear train means for causing the drive shaft 13 to rotate when the main shaft member 53 rotates, and includes flywheel means for being rotated by the gear train means and for moderating any fluctuations in the speed of rotation of the main shaft member 53, etc., in a manner as will be apparent to those skilled in the art. The specific construction of the gear train means and flywheel means may vary as will be apparent to those skilled in the art. Preferably, the gear train means includes a third gear member 59 and a fourth gear member (not shown) fixedly attached to the main shaft member 53 for rotation therewith, fifth and sixth gear members 63, 65 for respectively and operatively engaging the third gear member 59 and the fourth gear member and for being rotated thereby, seventh and eighth gear members 67, 69 for being selectively engaged by the fifth and sixth gear members 63, 65 respectively in a manner which will hereinafter be disclosed for being rotated thereby, ninth and tenth gear members 71, 73 for being operatively rotated by the seventh and eighth gear members 67, 69 respectively, eleventh gear members 75 for being rotated by the tenth gear member 73, twelfth and thirteenth gear members 77, 79 for being rotated by the eleventh gear member 75, fourteenth and fifteenth gear members 81, 83 for being rotated by the twelfth and thirteenth gear members 77, 79 respectively, sixteenth gear member 85 for being rotated by the fourteenth and fifteenth gear members 81, 83, and seventeenth gear member 87 fixedly attached to the drive shaft 13 and for being rotated by the sixteenth gear member 85. The flywheel means preferably includes a pair of substantially heavy flywheel members 89, 91 fixedly attached to a shaft 93 which extends through the gear members 81, 83, 85 for being rotated when the gear members 77, 79 rotate the gear members 81, 83. The shaft 93 is preferably rotatably attached to the casing means 15 in any manner apparent to those skilled in the art such as by way of roller bearings or the like.

The fifth and sixth gear members 63, 65 may be made to selectively engage the seventh and eighth gear members 67, 69 respectively in various manners which should now be apparent to those skilled in the art. Preferably, a first solenoid means 95 is operatively associated with the fifth gear member 63 for selectively pulling the fifth gear member 63 into operative engagements with the seventh gear member 67 (see, in general, FIGS. 2 and 3). Likewise, a second solenoid means 97 is preferably operatively associated with the sixth gear member 65 into engagement with the eighth gear member 69. The first and second solenoid means 95, 97 may be fixedly attached to the casing means 15 by way of support members 99 or the like.

The motor means for selectively rewinding the first and second spring cylinder means 17, 19 (i.e., for selectively causing the axle means 31 of the first and second spring cylinder means 17, 19 to rotate in the second direction) preferably includes a first motor means 101 for causing the axle means 31 of the first spring cylinder means 17 to rotate in the second direction and preferably includes a second motor means 103 for causing the axle means 31 of the second spring cylinder means 19 to rotate in the second direction (see FIG. 1). The first and second motor means 101, 103 are substantially identical to one another and the below description of the first motor means 101 should suffice for both (like parts of the first and second motor means 101, 103 will be referened by like numerals in the drawings, etc.). The first motor means 101 preferably includes a motor member 105 for being attached to the casing means 15 in any manner apparent to those skilled in the art such as, for example, by a support member 107. The first motor means 101 also preferably includes a gear member 109 for being rotated by the motor member 105 and for operatively engaging the second gear member 39 of the first spring cylinder means 17 to selectively cause the axle means 31 of the first spring cylinder means 17 to rotate in the second direction to thereby rewind or recoil the power spring means 33 thereof (see FIGS. 1 and 10). The motor member 105 is preferably an electrically driven motor of any type well-known to those skilled in the art such as that commonly used as a starter motor in an internal combustion engine. However, it should be noted that a motor member 105 may consist of a relatively small internal combustion engine or the like.

Figure 8:
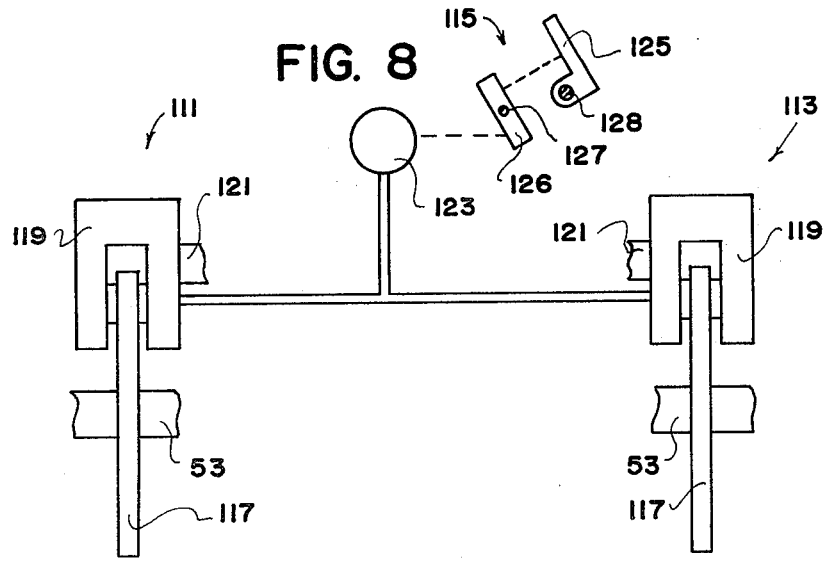
FIG. 8 is a somewhat diagrammatic view of a portion thereof.
Figure 9:
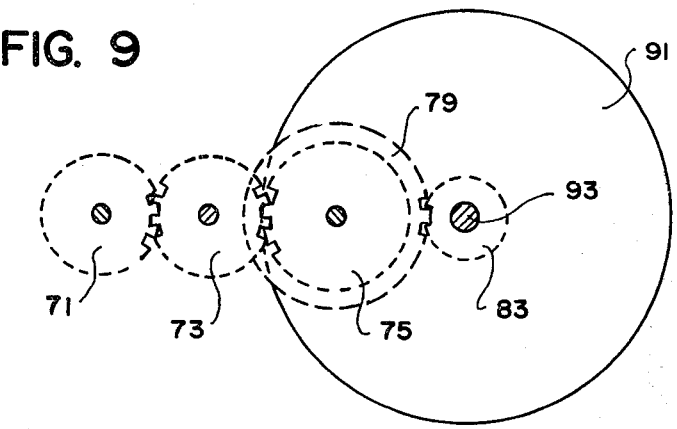
FIG. 9 is a sectional view thereof as taken on line IX—IX of FIG. 1.
Figure 10:
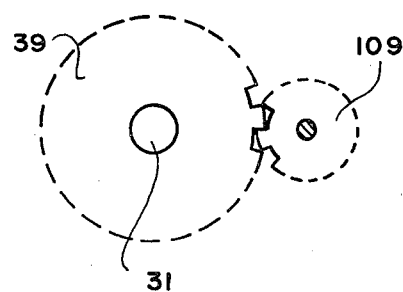
FIG. 10 is a sectional view thereof as taken on line X—X of FIG. 1.
Figure 11:
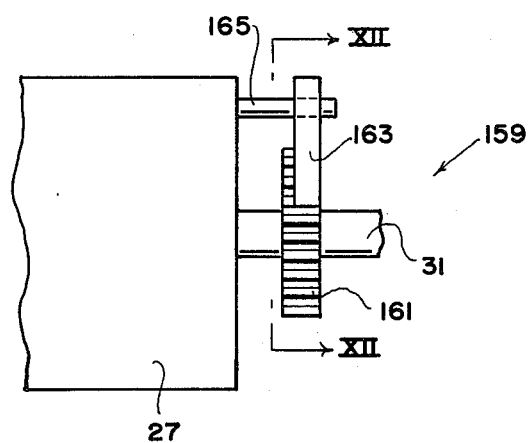
FIG. 11 is a side elevational view of a portion of the first embodiment of the spring motor of the present invention.
Figure 12:
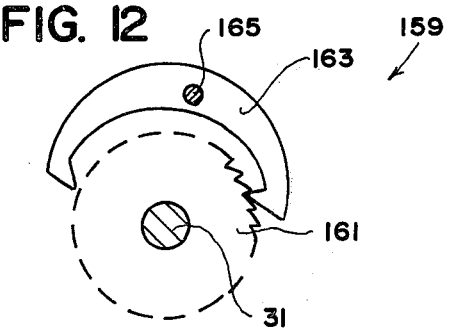
FIG. 12 is a sectional view as taken on line XII—XII of FIG. 11.

The spring motor 11 preferably includes throttle means for controlling the speed of rotation of the drive shaft 13. The throttle means preferably includes a first and second brake means 111, 113 (see FIGS. 1 and 8) for normally preventing rotation of the drive shaft 13 and includes a regulator means 115 (see FIG. 8) for causing the brake means 111, 113 to variably release the drive shaft 13. The first and second brake means 111, 113 are substantially identical to one another and the below description of the first brake means 111 should suffice for both (like parts of the first and second brake means 111, 113 being identified in the drawings by like reference numerals). The first brake means 111 preferably includes a disc member 117 being fixedly attached to the main shaft member 53 for rotating therewith and includes caliper means 119 for variably grasping the disc member 117 to selectively prevent rotation thereof and to allow rotation thereof at varying speeds (see, in general, FIG. 8). The caliper means 119 is similar to that of a typical disc brake assembly used in the brake mechanism of many automobiles and the construction thereof will be apparent to those skilled in the art. The caliper means 119 is preferably fixedly attached to the casing means 15 in any manner apparent to those skilled in the art such as by way of a support member 121 or the like. The regulator means 115 preferably includes a hydraulic means 123 for selectively causing the caliper means 119 to variably grasp the disc members 117 in substantially the same manner as a master cylinder of an automobile brake mechanism causes the caliper means thereof to variably grasp the disc members thereof, and preferably includes a lever 125 for controlling the hydraulic means 123 in substantially the same manner as the brake pedal of a standard automobile brake assembly controls the master cylinder thereof. However, the lever 125 is preferably adapted to cause the hydraulic means 123 to cause the caliper means 119 to release the disc members 117 when the lever 125 is pushed downward (i.e., the lever 125 acts in a substantially inverse manner to the standard brake pedal of an automobile brake assembly). This may be accomplished by various mechanical connections such as shown in FIG. 8 in which a pivot rod 126 is pivotally attached to support structure (not shown) through a pivot pin 127, the lever 125 is mechanically attached to a portion of the pivot rod 126 above the pivot pin 127, and the hydraulic means 123 is mechanically attached to a portion of the pivot rod 126 below the pivot pin 127 whereby downward (or inward) movement of the lever 125 will cause the pivot rod 126 to rotate in a counterclockwise direction (as viewed in FIG. 8) to cause the hydraulic means 123 to cause the caliper means 119 to variably release the disc members 117 an amount depending on the amount of movement of the lever 125. Conversely, when pressure is released from the lever 125, springs or the like (not shown) will cause the lever 125 to move upward (or outward) thereby causing the pivot rod 126 to rotate clockwise (as viewed in FIG. 8) which will cause the hydraulic means 123 to cause the caliper means 119 to grasp the disc members 117 to substantially prevent rotation of the drive shaft 13. It should be noted that the lever 125 is pivotally attached to support structure (not shown) by a pivot pin 128 (see FIG. 8).

Figure 3:
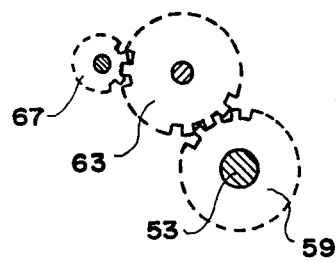
FIG. 3 is a sectional view similar to FIG. 2 but with certain parts thereof in a moved position.

The spring motor 11 preferably includes control means (see, in general, FIG. 4) for causing the power spring means 33 of the first and second spring cylinder means 17, 19 to uncoil in a sequential fashion one after the other. The control means preferably includes first and second solenoid means for selectively preventing rotation of the axle means 31 of the first and second spring cylinder means 17, 19 respectively in the first direction. The heretofore described first and second solenoid means 95, 97 may perform this function in a manner to be disclosed. The control means may include a control switch means 129 electrically coupled to the first and second solenoid means 95, 97 for controlling the first and second solenoid means 95, 97. The control switch means 129 and solenoid means 95, 97 may be electrically coupled to a source of electrical energy as a battery 131 by way of an electric circuit such as schematically shown in FIG. 3. The electric circuit may include a key lock master switch 133 or the like. The control means preferably includes a first switch means 135 associated with the first spring cylinder means 17 for being closed by the power spring means 33 thereof when the power spring means 33 thereof has uncoiled or unwound a predetermined amount. The control means includes a first light means 137 for being lit when the first switch means 135 is closed to thereby indicate that the power spring means 33 of the first spring cylinder means 17 has uncoiled a predetermined amount. The control means also includes a second switch means 139 associated with the second spring cylinder means 19 for being closed when the power spring means 33 thereof has uncoiled a predetermined amount and includes a second light means 141 for being lit when the second switch means 139 is closed to thereby indicate when the power spring means 33 of the second spring cylinder means 19 has uncoiled a predetermined amount. The switch means and light means 135, 137, 139, 141 are preferably electrically coupled to the battery 131 by the electric circuit substantially as shown in FIG. 3. The specific construction of the first and second switch means 135, 139 may vary. Preferably, each switch means 135, 139 is fixedly attached to the interior of the body means 27 of the respective spring cylinder means 17, 19 as diagrammatically shown in FIG. 7 whereby the power spring means 33 thereof will contact the blade member of the respective switch means 135, 139 when the power spring means 33 uncoils a predetermined amount to close the blade member in a manner as should now be apparent to those skilled in the art. The electric circuit preferably includes a third switch means 143 for electrically coupling the motor member 105 of the first motor means 101 to the battery 131 and preferably includes a fourth switch means 145 for electrically coupling the motor member 105 of the second motor means 101 to the battery 131 as schematically shown in FIG. 3.

The first and second solenoid means 95, 97 may be mechanically coupled to first and second pawl members 147, 149 respectively (see, in general, FIG. 1). The first and second pawl members 147, 149 may be adapted to selectively engage the plate-like members 41 of the first and second spring cylinder means 17, 19 respectively to selectively prevent rotation thereof to thereby prevent rotation of the axle means 31 of the respective spring cylinder means 17, 19 in the first direction. Each plate-like member 41 may have an aperture 151 for selectively receiving a portion of one of the pawl members 147, 149 (see FIG. 6). It should be noted that the first solenoid means 95 is preferably of the pull-type for pulling the gear member 63 into engagement with the gear member 67 when activated. Thus, the pawl member 147 may be merely fixedly attached to the movable plunger 153 of the first solenoid means 95 (see FIG. 1) for movement therewith so that when the first solenoid means 95 is activated by may of the control switch means 129, it will pull the pawl member 147 out of engagement with the plate-like member 41 to allow the axle means 31 of the first spring cylinder means 17 to rotate in the first direction, and will, at the same time, pull the gear member 63 into engagement with the gear member 67. The second solenoid means 97, on the other hand, is preferably of the push-type for pushing the gear member 65 into engagement with the gear member 69 when activated. Thus, the pawl member 149 must be coupled to the movable plunger 155 of the second solenoid means 97 in such a manner so as to be pulled out of engagement with the plate-like member 41 when the plunger 155 is extended. One way of doing this is to pivotally attach the pawl member 149 to the plunger 155 and the casing means 15 as clearly shown in FIG. 1 and as will now be apparent to those skilled in the art.

Figure 4:
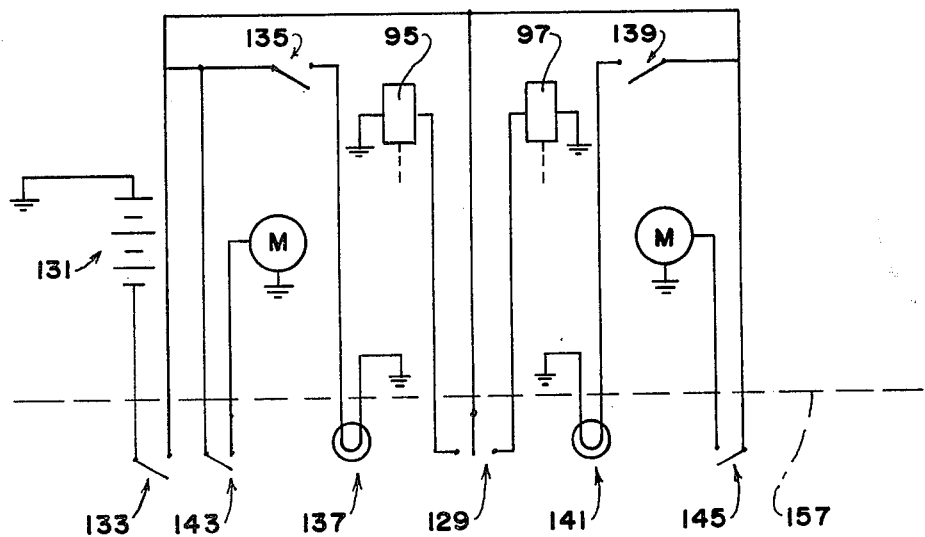
FIG. 4 is an electrical schematic view of various electrical components of the first embodiment of the spring motor of the present invention.
Figure 5:
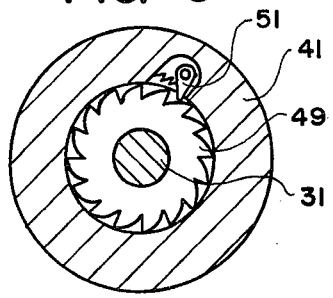
FIG. 5 is a sectional view of a portion of the spring motor of the present invention as taken on line V—V of FIG. 1.
Figure 6:
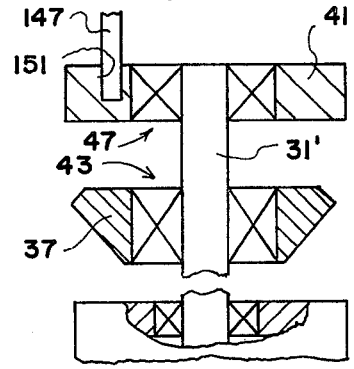
FIG. 6 is a partially sectional view thereof as taken on line VI—VI of FIG. 1 but with some portions thereof rotated for clarity.
Figure 7:
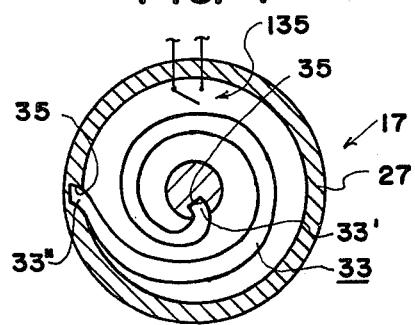
FIG. 7 is a sectional view thereof as taken on line VII—VII of FIG. 1.

The operation of the spring motor 11 is as follows: To begin operation of the spring motor 11, the first step is to close the key lock master switch 133. Next, the control switch means 129 is moved to a position to electrically activate one of the first and second solenoid means 95, 97. It should be noted that if one of the power spring means 33 of the first and second spring cylinder means 17, 19 is unwound a predetermined amount, the associated light means 137, 141 will be lit to indicate that the control switch means 129 be used to activate the opposite solenoid means 95, 97. Also, the light will indicate that one of the switch means 143, 145 should be closed to activate one of the motor members 105 to rewind the uncoiled power spring means 33. Assuming that the control switch means 129 is closed to electrically activate the first solenoid means 95, the power spring means 33 of the first spring cylinder means 17 will then be allowed to uncoil upon operation of the throttle means thereby transferring rotation through the gear train means to the drive shaft 13. Once the power spring means 33 of the first cylinder means 17 has uncoiled a predetermined amount, the switch 135 will be closed causing the light 137 to be lit to indicate to the operator of the device to move the control switch 129 so as to electrically activate the second solenoid means 97 thereby allowing the second spring cylinder means 19 to transfer rotation to the drive shaft 13. The switch 143 can then be closed to cause the first motor means to rewind the power spring means 33 of the first cylinder means 17. The first and second cylinder means 17, 19 can then be sequentially operated in the above fashion as long as it is desired to rotate the drive shaft 13. It should be noted that if the spring motor 11 is utilized to rotate the drive shaft of an automobile or the like, the lever 125, switch means 129, 133, 143, 145 and light means 137, 141 are preferably located within the interior of the automobile as indicated in FIG. 4 where the broken line 157 represents the dashboard of an automobile.

The spring motor 11 may include first and second escapement means 159 (see FIGS. 1, 11 and 12) for controlling and regulating the rotation of the axle means 31 of the first and second spring cylinder means 17, 19 respectively in the first direction. Each escapement means 159 preferably includes a gear member 161 fixedly attached to the respective axle means 31 for rotation therewith and a jaw member 163 pivotally supported relative to the gear member 161 for selectively engaging the gear member 161 to control the rotation thereof and thereby control the rotation of the axle means 31. The jaw member 163 is pivotally supported by a pivot rod 165 which may be attached to the body means 27 of the respective spring cylinder means 17, 19. A typical and well-known balance wheel mechanism (not shown) similar to that commonly used in clocks and the like can be used to selectively pivot the jaw member 163 from side to side to allow the gear member 161, and the axle means 31, to rotate at a steady, substantially even rate in a manner as will now be apparent to those skilled in the art.

It should be noted that various accessories and the like such as air conditioner compressors, alternators, etc., may be coupled to the gear train or the like in any manner which should now be apparent to those skilled in the art for being rotatably driven thereby.

Figure 13:
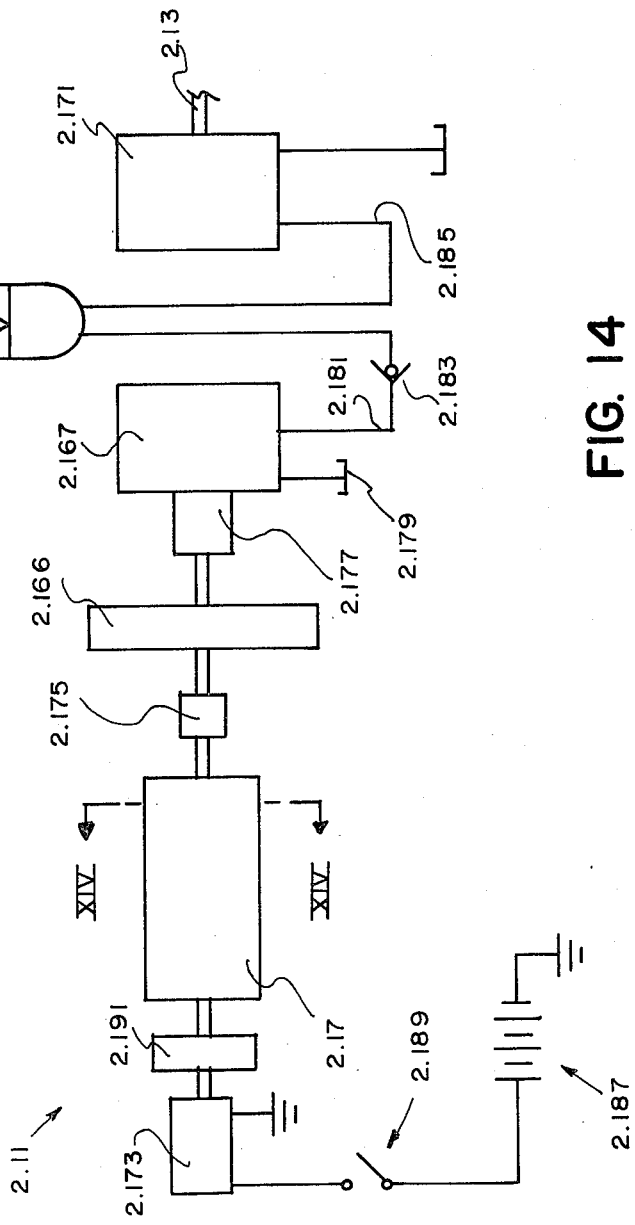
FIG. 13 is a somewhat diagrammatic view of a second embodiment of the spring motor of the present invention.
Figure 14:
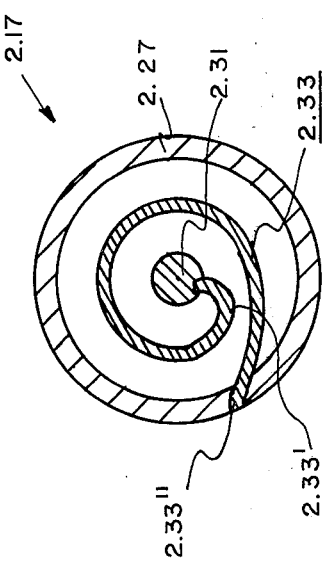
FIG. 14 is a sectional view as taken on line XIV—XIV of FIG. 13.

A second embodiment of the spring motor of the present invention is schematically shown in FIGS. 13 and 14 and identified by the reference number 2.11. The spring motor 2.11 of the present invention is for selectively rotating a drive shaft 2.13 which can be used in any manner apparent to those skilled in the art such as, for example, driving a generator, pump, farm implement, vehicle, fan blower, conveyor, etc. In general, the spring motor 2.11 includes a spring cylinder means 2.17, a flywheel means 2.166 for being rotated by the spring cylinder means 2.17, a hydraulic pump means 2.167 for being driven by the flywheel means 2.88, a hydraulic accumulator means 2.169 for receiving pressurized hydraulic fluid from the pump means 2.167, a hydraulic motor means 2.171 for being selectively driven by pressurized hydraulic fluid from the pump means 2.167 and the accumulator means 2.169 and for rotating the drive shaft 2.13, and a rewind motor means 2.173 for selectively rewinding the spring cylinder means 2.17.

The spring cylinder means 2.17 may be substantially identical to the above described spring cylinder means 17, 19 of the first embodiment and includes a body means 2.27 for being fixedly anchored against rotation, an axle means 2.31 for being rotatably attached to the body means 2.27, and a spiral power spring means 2.33 having a first end 2.33' for being attached to the axle means 2.31 and having a second end 2.33" for being attached to the body means 2.27 (see FIG. 14). Uncoiling or unwinding of the power spring means 2.33 will cause the axle means 2.31 to rotate in a first direction (e.g., clockwise). Rotation of the axle means 2.31 in a second direction (e.g., counterclockwise) will cause the power spring means 2.33 to coil or rewind. The above description of the spring cylinder means 17, 19 of the first embodiment should be consulted for a more detailed description. It should be noted that the spring motor 2.11 may include a plurality of spring cylinder means 2.17 coupled to the flywheel means 2.166.

The flywheel means 2.166 may be substantially similar to either of the above described flywheel members 89, 91 and may be of any construction well-known to those skilled in the art.

A clutch means 2.175 is preferably positioned between the spring cylinder means 2.17 and the flywheel means 2.166 for allowing the flywheel means 2.166 to be selectively disengaged from the axle means 2.31 of the spring cylinder means 2.17. The clutch means 2.175 may be, for example, the over-running ball-bearing clutch, model number FSO-750, manufactured by Form Sprag Co. of Warren, Mich.

A coupling means 2.177 may be provided between the flywheel means 2.166 and the hydraulic pump means 2.167 to help attach the flywheel means 2.166 and the pump means 2.177 to one another. The coupling means 2.179 may be, for example, the flexible shaft coupling model 20T10 manufactured by Falk Corp. of Milwaukee, Wis.

The hydraulic pump means 2.167 may be of any construction and operation well-known to those skilled in the art. For example, the pump means 2.167 may be one of the servo controlled, series 20 variable displacement pumps manufactured by Sundstrand Corp. of Ames, Iowa. In general, the pump means 2.167 will pump hydraulic fluid from a reservoir 2.179 and to a hydraulic conduit 2.181 when activated by the flywheel means 2.166.

The hydraulic conduit 2.181 extends from the pump means 2.167 to the hydraulic accumulator means 2.169 for allowing hydraulic fluid to be pumped from the reservoir 2.179 to the accumulator means 2.169. A check valve 2.183 of any known construction is preferably provided in the hydraulic conduit 2.181 to allow hydraulic fluid to pass from the pump means 2.167 to the accumulator means 2.169 while preventing hydraulic fluid from passing from the accumulator means 2.169 back to the pump means 2.167. The accumulator means 2.169 may be of any construction well-known to those skilled in the art. For example, the accumulator means 2.169 may be the accumulator, model number AU1530, manufactured by EMG Hydraulic, Inc. of Port Huron, Mich. It should be noted that a plurality of accumulator means 2.169 (not shown) may be associated with the pump means 2.167 in any manner now apparent to those skilled in the art.

A hydraulic conduit 2.185 extends between the accumulator means 2.169 and the hydraulic motor means 2.171 for allowing hydraulic fluid to pass from the accumulator means 2.169 to the hydraulic motor means 2.171. The hydraulic motor means 2.171 may be any construction apparent to those skilled in the art. For example, the motor means 2.171 may be one of the servo controlled, series 20 variable displacement motors manufactured by Sundstrand Corp. of Ames, Iowa.

The rewind motor means 2.173 may be of any type apparent to those skilled in the art. For example, the rewind motor means 2.173 may be an electric powered motor and may be driven by a battery 2.187 or other source of electrical energy. A switch 2.189 may be interposed between the battery 2.187 and the motor means 2.173 for controlling the operation of the motor means 2.173.

A clutch/brake means 2.191 may be positioned between the spring cylinder means 2.17 and the rewind motor means 2.173 for allowing the axle means 2.31 of the spring cylinder means 2.17 to be selectively disengaged from the rewind motor means 2.173 and to selectively prevent the axle means 2.31 of the spring cylinder means 2.17 from rotating. The clutch/brake means 2.177 may be, for example, the clutch/brake model number EP-1000 manufactured by Warner Electric Brake and Clutch Co. of Beloit, Wis.

The various components of the spring motor 2.11 (e.g., the hydraulic motor means 2.171, the rewind motor means 2.173, the clutch means 2.175, the clutch/brake means 2.191) may be controlled manually, mechanically or electrically as will be apparent to those skilled in the art. On the other hand, the spring motor 2.11 may include a microprocessor or the like for controlling the various functions of the spring motor 2.11 in a manner which will now be apparent to those skilled in the art. The microprocessor may be, for example, the Director Model 1001 Microprocessor manufactured by Struthers-Dunn, Inc. of Bettendorf, Iowa. The actual construction, operation and programming of the microprocessor as well as the actual coupling of the microprocessor to the various other elements of the spring motor 2.11 will depend on the specific use the spring motor 2.11 is put to, etc., and will now be apparent to those skilled in the art.

The operation of the spring motor 2.11 is as follows:

Assuming an initial condition in which the spring cylinder means 2.17 is relaxed, the battery 2.187 is fully charged, the flywheel means 2.155 is at rest, and the accumulator means 2.169 is fully discharged, to begin operation of the spring motor 2.11, the switch 2.189 is closed to activate the rewind motor means 2.173. The clutch/brake means 2.191 is set to allow the rewind motor means 2.173 to wind or coil the power spring means 2.33 of the spring cylinder means 2.17 (e.g., the clutch portion of the clutch/brake means 2.191 is engaged while the brake portion thereof is disengaged). When the power spring means 2.33 is fully wound, the rewind motor means 2.173 can be deactivated and the brake/clutch means 2.191 set to allow the power spring means 2.33 to unwind (i.e., both the clutch and brake portions of the clutch/brake means 2.191 are disengaged) thereby imparting torque to the flywheel means 2.166 through the clutch means 2.175. When the power spring means 2.33 has fully discharged and the axle means 2.31 is at rest, the flywheel means 2.166 will continue to rotate and the clutch means 2.175 will allow the flywheel means 2.166 to freely rotate even while the axle means 2.31 is at rest or being rotated in the opposite direction. Rotation of the flywheel means 2.166 will activate the pump means 2.167 causing hydraulic fluid to be pumped from the reservoir 2.179 to the accumulator means 2.169 where it is stored under pressure for subsequent use by the hydraulic motor means 2.171. When it is desired to rotate the drive shaft 2.13, the valve component (not shown) of the hydraulic motor means 2.171 is opened, allowing pressurized hydraulic fluid to pass from the accumulator means 2.169 to the motor means 2.171. At any time after the power spring means 2.33 has been discharged, it can be rewound by activating the rewind motor means 2.173 with the clutch portion of the clutch/brake means 2.191 engaged and with the brake portion thereof disengaged. When the power spring means 2.33 has been thus rewound, the brake portion of the clutch/brake means 2.191 is engaged to prevent inadvertent unwinding thereof. Then, when it is desired to transmit more torque to the flywheel means 2.166, the brake portion of the clutch/brake means 2.191 is merely disengaged. Thus, the drive shaft 2.13 can be rotated at a steady, even rate even while the power spring means 2.33 is at rest or being rewound.

Although the present invention has been described and illustrated with respect to preferred embodiments thereof, it is not to be so limited, since changes and modifications may be made therein which are within the full intended scope of the invention.

I claim:

1. A spring motor for selectively rotating a drive shaft, said spring motor comprising:
   (a) a casing means;
   (b) first and second spring cylinder means, each of said first and second spring cylinder means including:
      (i) body means for being fixedly attached to said casing means,
      (ii) axle means for being rotatably attached to said body means, said axle means having a first end and a second end,
      (iii) spiral power spring means having a first end for being attached to said axle means and having a second end for being attached to said body means, uncoiling of said power spring means causing said axle means to rotate in a first direction, rotation of said axle means in a second direction causing said power spring means to coil,
      (iv) a first gear member attached to said first end of said axle means, and
      (v) a second gear member attached to said second end of said axle means;
   (c) a transfer means for transfering rotation of said axle means of said first and second spring cylinder means to the drive shaft, said transfer means comprising:
      (i) a main shaft member for being rotatably attached to said casing means and having first and second ends,
      (ii) a first gear member attached to said first end of said main shaft member and for operatively engaging said first gear member of said first spring cylinder means to cause said main shaft member to rotate when said power spring means of said first spring cylinder means uncoils,
      (iii) a second gear member attached to said second end of said main shaft member and for operatively engaging said first gear member of said second spring cylinder means to cause said main shaft member to rotate when said power spring means of said second spring cylinder means uncoils,
      (iv) gear train means for causing the drive shaft to rotate when said main shaft member rotates, and
      (v) flywheel means for being rotated by said gear train means and for moderating any fluctuations in the speed of rotation of said main shaft member;
   (d) a motor means for selectively rewinding said power spring means of said first and second spring cylinder means; and
   (e) control means for causing said power spring means of said first and second spring cylinder means to uncoil in a sequential fashion one after the other, said control means including a first solenoid means for selectively preventing rotation of said axle means of said first spring cylinder means in said first direction; said control means including a second solenoid means for selectively preventing rotation of said axle means of said second spring cylinder means in said first direction; and said control means including control switch means electrically coupled to said first and second solenoid means for controlling said first and second solenoid means.

2. The spring motor of claim 1 in which said control means includes a first switch means associated with said first spring cylinder means for being closed when said power spring means of said first spring cylinder means has uncoiled a predetermined amount, includes a first light means for being lit when said first switch means is closed, includes a second switch means associated with said second spring cylinder means for being closed when said power spring means of said second spring cylinder means has uncoiled a predetermined amount, and includes a second light means for being lit when said second switch means is closed.

3. The spring motor of claim 2 in which is included throttle means for controlling the speed of rotation of the drive shaft, said throttle means including brake means for normally preventing rotation of the drive shaft and including regulator means for causing said brake means to variable release the drive shaft.

4. The spring motor of claim 3 in which said brake means includes a disc member fixedly attached to said main shaft member of said transfer means and includes caliper means for variably grasping said disc member to selectively prevent rotation thereof.

5. The spring motor of claim 4 in which said gear train means includes a first gear member and a second gear member; in which said control means includes a first gear means for being moved by said first solenoid means between a first position operatively engaging said first gear member of said gear train means to cause the drive shaft to rotate in a first direction, and a second position out of contact with said first gear member of said gear train means; and in which said control means includes a second gear means for being moved by said second solenoid means between a first position operatively engaging said second gear member of said gear train means to cause the drive shaft to rotate in said first direction, and a second position out of contact with said second gear member of said gear train means.

6. The spring motor of claim 2 or 5 in which each of said first and second spring cylinder means includes a first ratchet means for allowing free rotation between said axle means and said first gear member thereof in said second direction, a second ratchet means for allowing free rotation between said axle means and said second gear member thereof in said first direction, and a third ratchet means for allowing said axle means thereof to freely rotate in said second direction even when said axle means thereof is prevented from rotating in said first direction.

7. The spring motor of claim 6 in which said motor means includes a first motor means for selectively causing said axle means of said first spring cylinder means to rotate in said second direction, said first motor means including a motor member for being attached to said casing means and a gear member for being rotated by said motor member and for operatively engaging said second gear member of said first spring cylinder means; and in which said motor means includes a second motor means for selectively causing said axle means of said second spring cylinder means to rotate in said second direction, said second motor means including a motor member for being attached to said casing means and a gear member for being rotated by said motor member and for operatively engaging said second gear member of said second spring cylinder means.

8. The spring motor of claim 1 in which is included first and second escapement means for regulating the rotation of said axle means of said first and second spring cylinder means.

* * * * *